(12) United States Patent
Dunn et al.

(10) Patent No.: US 6,417,888 B1
(45) Date of Patent: Jul. 9, 2002

(54) ON SCREEN DISPLAY PROCESSOR

(75) Inventors: Perry S. Dunn, Woodbury, NJ (US); Sharmila Ravi, Harleysville; Leonard Colavito, Newtown, both of PA (US)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 0 days.

(21) Appl. No.: 09/169,725

(22) Filed: Oct. 9, 1998

(51) Int. Cl.$^7$ ................................................ H04N 5/50
(52) U.S. Cl. ...................................................... 348/569
(58) Field of Search ................................ 348/714, 716, 348/718, 578, 511, 906, 569; 345/123, 124, 125, 121

(56) References Cited

U.S. PATENT DOCUMENTS

| 4,612,569 | A | * | 9/1986 | Ichinose | ...................... 358/22 |
| 4,649,379 | A | | 3/1987 | Canton et al. | |
| 5,699,124 | A | * | 12/1997 | Nuber et al. | ................. 348/478 |
| 5,844,615 | A | * | 12/1998 | Nuber et al. | ................. 348/478 |
| 5,907,366 | A | * | 5/1999 | Farmer et al. | ............... 348/478 |
| 6,128,032 | A | * | 10/2000 | Oh et al. | ........................ 348/10 |

FOREIGN PATENT DOCUMENTS

| WO | WO 96/19077 | 6/1996 |
| WO | WO 98/27722 | 6/1998 |

OTHER PUBLICATIONS

EPO Search Report, Feb. 6, 2001.
IBM Technical Disclosure Bulletin, vol. 32, No. 1, Jun. 1989, "Smooth Scroll Using Dual Port Dram".
Winzker et al. "Architecture and Memory Requirements for stand–alone and hierarchical MPEG2 HDTV–Decoders with Synchronous DRAMs" *IEEE* Apr. 30, 1995, pp 609–612.

* cited by examiner

*Primary Examiner*—Victor R. Kostak
(74) *Attorney, Agent, or Firm*—RatnerPrestia

(57) ABSTRACT

A decoder of an encoded video signal representing a video image includes an apparatus for scrolling an on screen display of closed caption information that is included in the encoded video signal. The apparatus decodes the closed caption data from the encoded video signal as a sequence of lines of on screen display data. An on screen display processor alternately stores successive groups of lines of the sequence of lines in a first memory buffer and in a second memory buffer where each successive group of lines is shifted by at least one line with respect to the previous group of lines. A display processor alternately displays the on screen display data from the first memory buffer and the second memory buffer synchronized with the storage into the buffers whereby the most recently stored group of lines is displayed. Rather than using first and second buffers, lines of on screen display data may be stored in a linked list of memory storage regions. On screen display information stored in the linked list is transferred to the display processor to produce the on screen display. To scroll the on screen display, a memory region is added to one end of the linked list and a memory region is dropped from the other end of the linked list where the added memory region stores a successive line of on screen display data from the sequence of lines of on screen display data.

27 Claims, 6 Drawing Sheets

ON SCREEN DISPLAY PROCESSOR

FIELD OF THE INVENTION

The present invention relates to a decoder which converts an encoded video signal, e.g. MPEG-2 encoded video signals, into an output video signal, and more specifically to an on screen display processor of the decoder that scrolls an on screen display.

BACKGROUND OF THE INVENTION

In the United States a standard has been proposed for digitally encoded high definition television signals (HDTV). A guide to the use of this standard entitled, "Guide to the Use of the ATSC Digital Television Standard", Doc. A/54 (1995), is provided by the Advanced Television Systems Committee (ATSC), and is hereby incorporated by reference. A portion of this standard is essentially the same as the MPEG-2 standard, proposed by the Moving Picture Experts Group (MPEG) of the International Organization for Standardization (ISO). The MPEG-2 standard is described in an International Standard (IS) publication entitled, "Information Technology—Generic Coding of Moving Pictures and Associated Audio, Recommendation H.626", ISO/IEC 13818-2, IS, 11/94 which is available from the ISO and which is hereby incorporated by reference for its teaching on the MPEG-2 digital video coding standard.

The MPEG-2 standard defines a complex syntax which contains a mixture of data and control information. Some of this control information is used to enable signals having several different formats to be covered by the standard. These formats define images having differing numbers of picture elements (pixels) per line, differing numbers of lines per frame or field, and differing numbers of frames or fields per second. In addition, the basic syntax of the MPEG-2 Main Profile defines the compressed MPEG-2 bit stream representing a sequence of images in five layers, the sequence layer, the group of pictures layer, the picture layer, the slice layer and the macroblock layer. Each of these layers is introduced with control information. Finally, other control information, also known as side information, (e.g. frame type, macroblock pattern, image motion vectors, coefficient zig-zag patterns and dequantization information) are interspersed throughout the coded bit stream.

A decoder decodes the mixture of data and control information and provides a video signal for displaying a video image. An on screen display (OSD) processor of a decoder may be used to provide an OSD in combination with the video image. It is desirable for an OSD have the capability to scroll. In addition, to reduce OSD implementation costs, it is desirable that an OSD processor provide an OSD using existing system resources rather than resources dedicated to implementing an OSD.

SUMMARY OF THE INVENTION

An apparatus for scrolling an on screen display using on screen display data that is included in an encoded video signal representing a video image. The apparatus includes a receiving means to receive the encoded video signal and decode the on screen display data as a sequence of lines of on screen display data. A memory means includes a first buffer and a second buffer. An on screen display processing means stores a group of lines of the sequence of lines of on screen display data in the first buffer and alternately stores successive groups of lines of the sequence of lines of on screen display data in the second buffer and the first buffer, wherein each successive group of lines is shifted by at least one line in the sequence of lines of on screen display data with respect to the previous group of lines. A display means for alternately displaying the on screen display data from the first buffer and the second buffer synchronized with the storage of the successive groups of lines of the sequence of lines of on screen display data in the first and second buffers wherein the most recently stored group of lines is displayed.

According to one aspect of the invention, the on screen display may be scrolled up or down by shifting each successive group of lines forward or backward, respectively, along the sequence of lines of on screen display data.

According to another aspect of the invention, rather than using a first buffer and a second buffer, the memory means includes a plurality of storage regions. The on screen display processing means forms a linked list of a group of the storage regions. The linked list of storage regions has a first region and last region. A group of lines of the sequence of lines of the on screen display data is stored in the linked list of storage regions. On screen display data corresponding to at least one successive line of on screen display data along the sequence of lines of on screen display data is then stored in one of the plurality of storage regions not currently in the linked list which is identified as the new link. The first region and the last region of the linked list are then shifted to add a region and delete a region from the group of storage regions in the linked list so the added region is the new link. The display means displays the group of lines of on screen data stored in the linked list. The on screen display is scrolled up and down by having the new link include the next or previous, respectively, successive line along the sequence of lines of on screen display data.

According to one aspect of the invention, the encoded video signal is an MPEG-2 bitstream and the on screen display data includes closed caption information which is encoded within a user data field of a sequence header, a group of pictures header, or a picture header.

BRIEF DESCRIPTION OF THE DRAWINGS

These and other features and advantages of the present invention will become apparent from the following detailed description, taken in conjunction with the accompanying drawings, wherein.

DETAILED DESCRIPTION

The present invention is described below with reference to the MPEG-2 video signal encoding standard. The teachings of this invention are not limited to applications using the MPEG-2 video signal and are applicable to other video display systems for providing an on screen display (OSD). The displayed OSD data may be, for example, closed caption information.

The MPEG-2 Main Profile standard defines encoding of a video signal as a sequence of images in five levels: the sequence level, the group of pictures level, the picture level, the slice level and the macroblock level. Each of these levels may be considered to be a record in a data stream, with the later-listed levels occurring as nested sub-levels in the earlier listed levels. The records for each level include a header section which contains data that is used in decoding its sub-records.

The headers of each of the sequence level, the group of pictures level, and the picture level include a user data field. In an exemplary embodiment of the present invention, OSD data used to generate an OSD is included in the user data field of at least one of the sequence level header, the group of pictures level header, and the picture level header. In another exemplary embodiment, the OSD data is included in a separate data program stream of the MPEG-2 bitstream.

Figure 1:
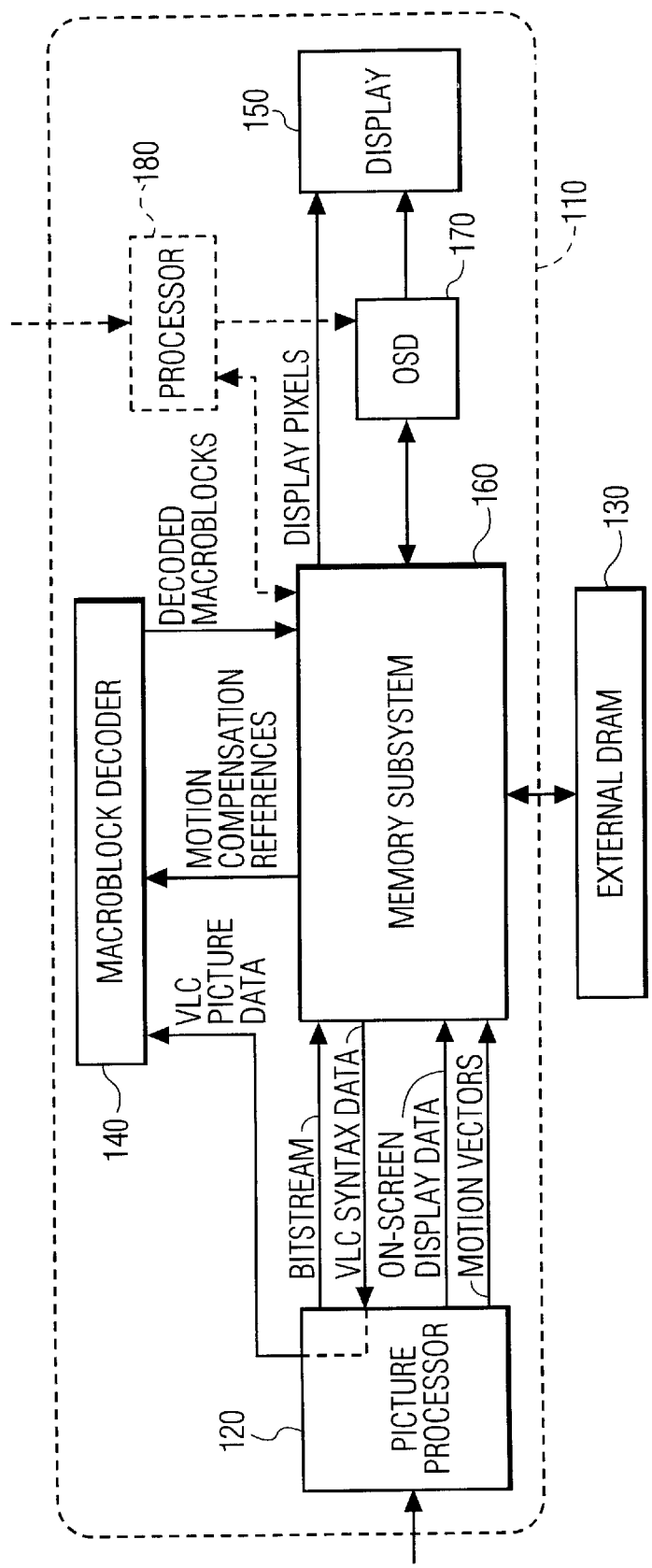
FIG. 1 is a high level block diagram of a video decoder according to the present invention.

FIG. 1 is a block diagram of an exemplary decoder 110 which embodies the present invention. The decoder 110 includes an interface to an external memory 130. The decoder 110 includes a picture processor 120, a macroblock decoder 140, a display section 150, a memory subsystem 160, and an on screen display (OSD) processor 170.

The picture processor 120 receives, stores and partially decodes the incoming bitstream of an encoded video image, e.g. an MPEG-2 video bitstream. The picture processor 120 then provides the encoded bitstream, OSD data, and motion vectors, which may be stored in the memory 130 via the memory subsystem 160. The memory subsystem 160 controls the storage and reading of information to and from the memory 130. The memory subsystem 160 provides picture data and bitstream data to the memory 130 for video decoding operations. The incoming OSD data is received as a sequence of lines of OSD data and is stored in an OSD section of the memory 130 by the memory subsystem 160. When the OSD data is included in a separate data program stream of the MPEG-2 bitstream, a separate optional processor 180 may be used to decode the bitstream, extract OSD information from the bitstream and provide the OSD information to the OSD processor 170. The inputs to the picture processor 120 and the optional processor 180 are received from a transport decoder (not shown), for example.

The interface between the memory subsystem 160 and the memory 130 may be a Concurrent RDRAM interface providing a 500 Mbps channel, and three RAMBUS channels may be used to support the necessary bandwidth. An embodiment of the present invention having a picture processor 120, a macroblock decoder 140, and a memory subsystem 160 operating with external memory 130 may employ a system as described in U.S. Pat. No. 5,623,311 entitled MPEG VIDEO DECODER HAVING A HIGH BANDWIDTH MEMORY to Phillips et al., which is incorporated herein by reference.

The macroblock decoder 140 receives the encoded bitstream, motion vectors, and stored motion compensation reference image data, if predictive encoding is used, and provides decoded macroblocks of the encoded video image to the memory subsystem 160. The display section 150 retrieves the decoded macroblocks from the memory subsystem 160 and formats these into the video image picture for display according to a particular display format.

The OSD processor 170 retrieves the incoming OSD data that was stored in the OSD section of the memory 130, reformats the OSD data into a format suitable for display by the display section 150, and stores the reformatted OSD data into memory 130. Reformatted OSD data is read by the OSD processor 170 through the memory subsystem 160 and provided to the display section 150 for display.

In a first exemplary embodiment, reformatted OSD data is stored in a first buffer and in a second buffer in memory 130. The contents of the first and second buffers are alternately transferred to the display section 150 for display of the OSD. While the contents of one buffer is used to display the OSD, the other buffer is being updated with OSD data that is shifted along the sequence of lines of OSD data. By alternating in this fashion, the OSD data being displayed may be scrolled along the received sequence of lines of OSD data.

Figure 2:
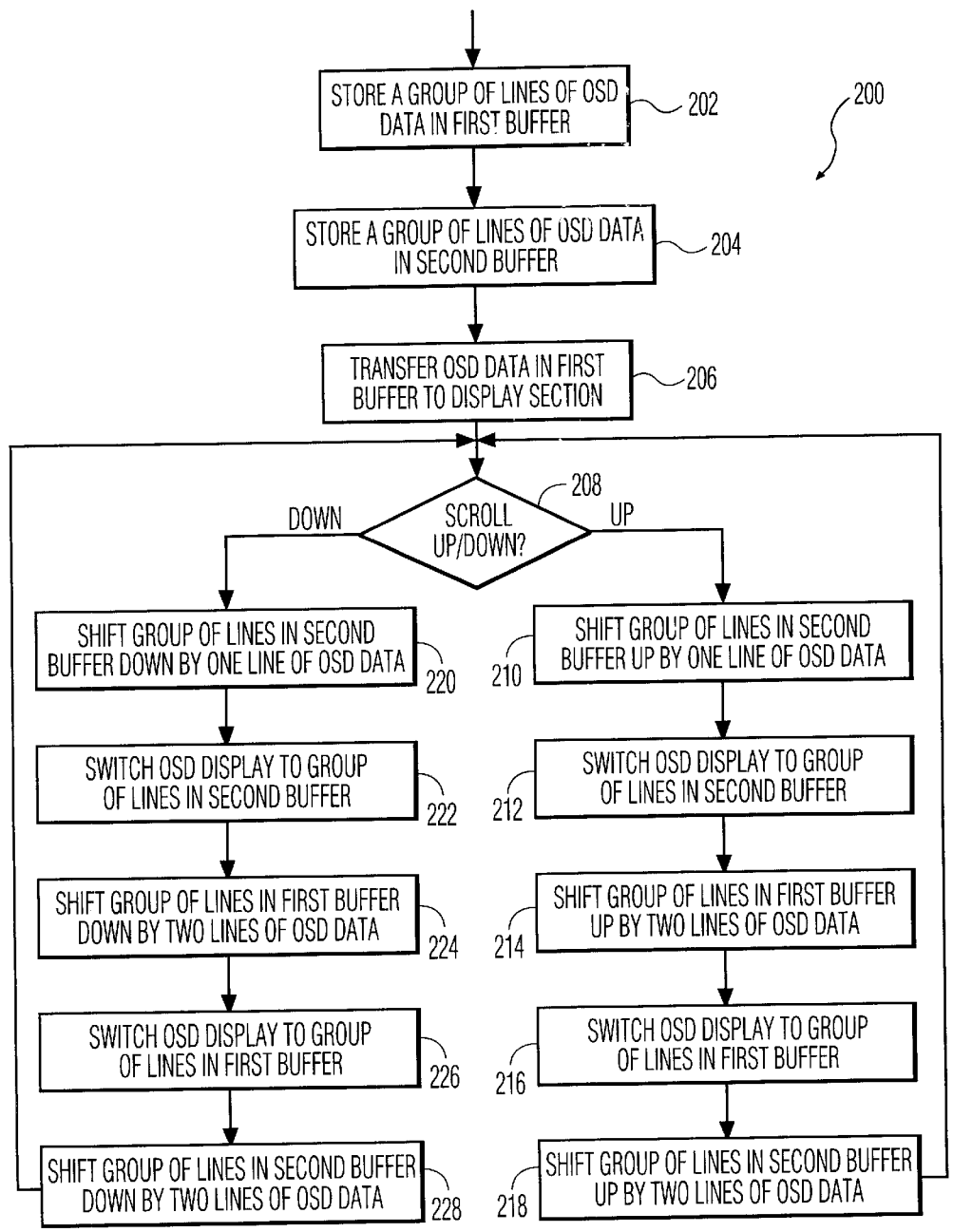
FIG. 2 is a flow-chart diagram which is useful for describing processing performed by an on screen display processor according to a first exemplary embodiment of the present invention.
Figure 3:
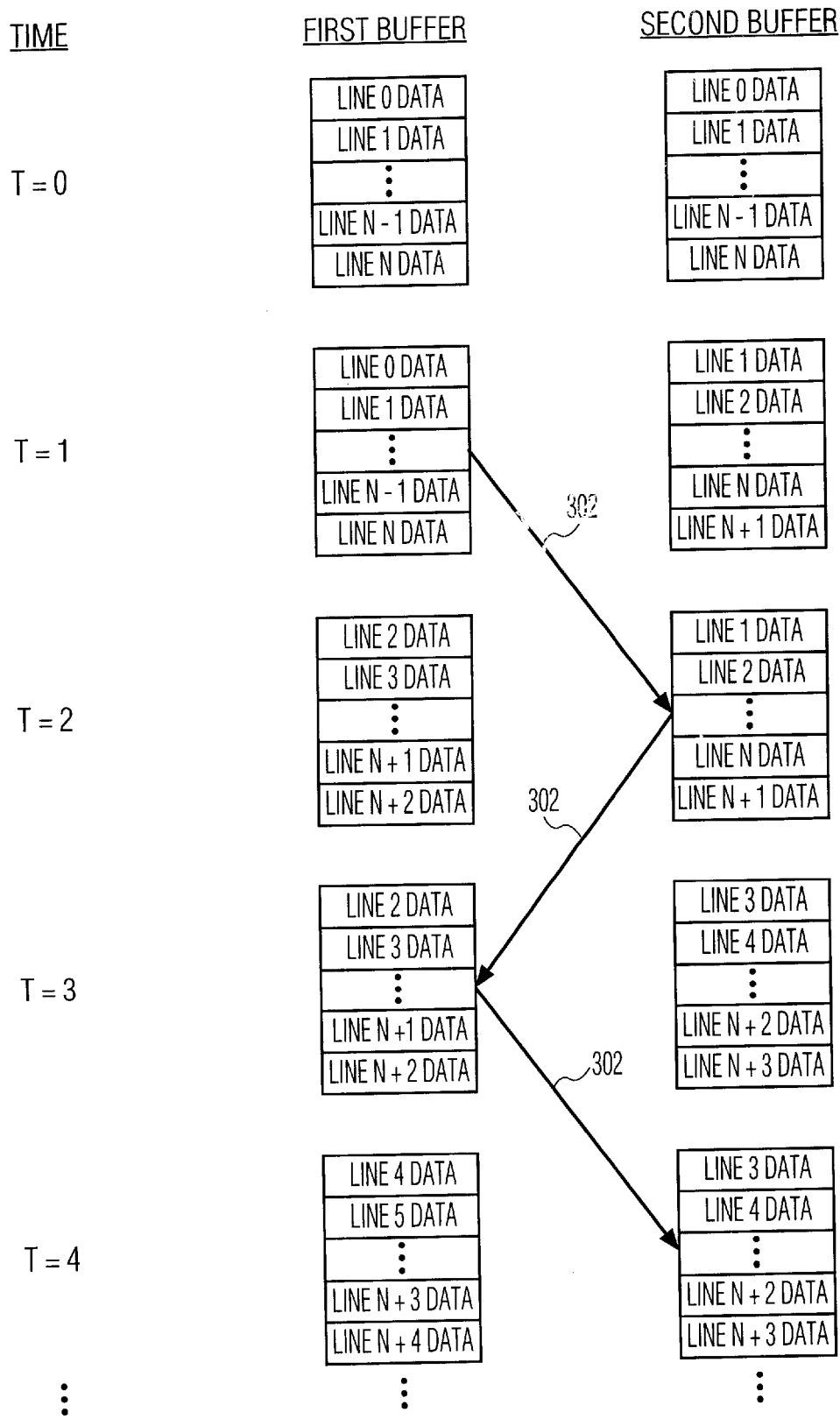
FIG. 3 shows memory contents during operation of the first exemplary embodiment of the present invention.

The first exemplary embodiment of the present invention is described with reference to FIGS. 2 and 3. FIG. 2 is a flow chart 200 which is useful for describing the operation of an OSD processor 170 according to this first exemplary embodiment of the invention. FIG. 3 shows how the OSD processor 170 stores reformatted OSD data in memory 130.

In steps 202 and 204 of FIG. 2, the OSD processor 170 stores a group of lines of OSD data in a first buffer and in a second buffer, respectively, in the memory 130. If the incoming OSD data is in the form of character codes, as known to those skilled in the art, the OSD processor 170 may convert the character codes into a group of lines of raster data before storage in the buffers.

In this exemplary embodiment, the first and second buffers each have a capacity to store N+1 video lines of OSD data. The diagram in FIG. 3, at T=0, illustrates the contents of the first and second buffers after steps 202 and 204. The OSD data stored in the first and second buffers at steps 202 and 204 is represented by Line 0 Data through Line N Data shown in FIG. 3 at Time T=0.

The OSD processor 170 transfers, in step 206, the group of lines of OSD data stored in the first buffer to the display section 150 for display. Further operation of the OSD processor 170 depends on whether the on screen display is to be scrolled up or scrolled down. Assuming in this example that the OSD is to be scrolled up, in step 208, operation is directed to step 210. The group of lines of OSD data in the second buffer is shifted up by one line of OSD data in step 210. The shifting operation may be performed, for example, using a sequence of block move operations where the first line of the source is defined to be one video line below the first line of the destination. The first line of OSD data, Line 0 Data, is shifted out the top of the second buffer. The next line of OSD data in the sequence of lines of OSD data, Line N+1 Data, is then shifted into the bottom of the second memory buffer. This new line of data may be written, for example, as a separate operation after the last block move operation. As shown in FIG. 3 at T=1, after step 210, Line 1 Data through Line N+1 Data is stored in the second buffer.

In step 212, the group of lines of OSD data stored in the second buffer is transferred to the display section 150 for display. The contents of the first buffer are then shifted up by two lines of OSD data in step 214. Line 0 Data and Line 1 Data are shifted out the top of the first buffer and the next two lines of OSD data in the received sequence of lines, Line N+1 Data and Line N+2 Data, are shifted into the bottom of the first memory buffer shown in FIG. 3 at T=2.

The arrows 302 in FIG. 3 illustrate the order of transfer of the first and second buffer contents to the display section 150 for display. Alternating between the first buffer and the second buffer, while OSD data is being shifted into and out of one buffer, the contents of the other buffer is displayed by the display section 150.

In step 216, the group of lines of OSD data stored in the first buffer is transferred to the display section 150 for display. The contents of the second buffer are then shifted up by two lines of OSD data in step 218. Line 1 Data and Line 2 Data are shifted out the top of the second buffer and the next two lines of OSD data in the received sequence of lines, Line N+2 Data and Line N+3 Data, are shifted into the bottom of the second memory buffer as shown in FIG. 3 at T=3.

Thereafter, steps 210 through 218 are repeated to continue scrolling through the received sequence of lines of OSD data. The operation of the OSD processor for the case where in step 208 it is determined that the OSD data is to be scrolled down is analogous to the scrolling up case. When scrolling down, steps 220 through 228 are followed rather than steps 210 through 218. In steps 220 through 228, the first and second buffers are updated by shifting out lines of OSD data from the bottom of the buffers and shifting the next lines of OSD data into the top of the buffers.

In a second exemplary embodiment, reformatted OSD data is stored in a linked list of memory regions in the memory 130. The contents of the memory regions in the linked list are transferred to the display section 150 to produce the OSD. The OSD is scrolled by shifting the linked list either forward or backward depending on whether the OSD is scrolled up or down. For example, when scrolling up, the first memory region in the linked list drops out of the linked list, the second memory region becomes the new first memory region in the linked list, and a memory region containing the next line in the sequence of OSD data is added at the end of the linked list. This added memory region may be the same region that previously was the first memory region in the linked list. Alternatively, this memory region may be a different memory region and the memory region dropped out of the linked list may be returned to a pool of memory resources available for other purposes or for later use within the linked list.

Figure 4:
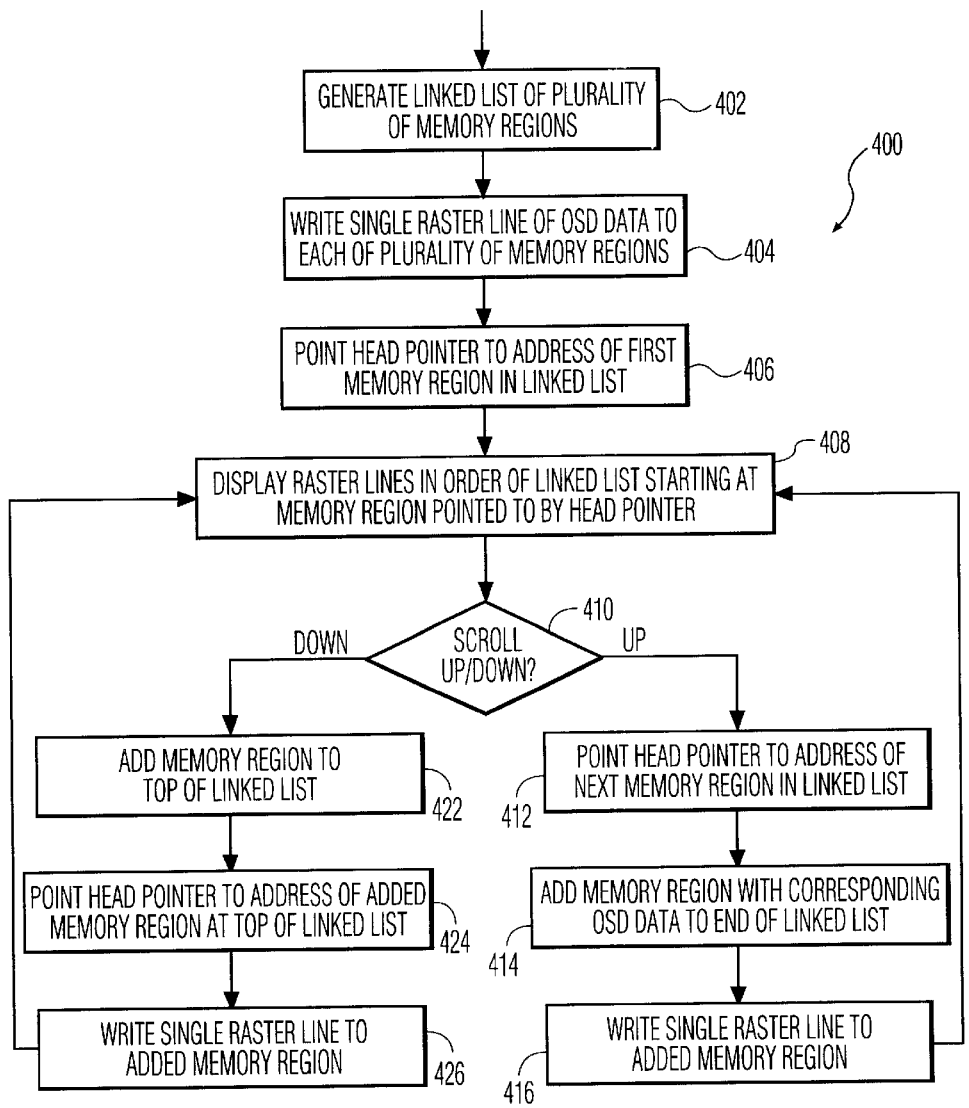
FIG. 4 is a flow-chart diagram which is useful for describing processing performed by an on screen display processor according to a second exemplary embodiment of the present invention.
Figure 5:
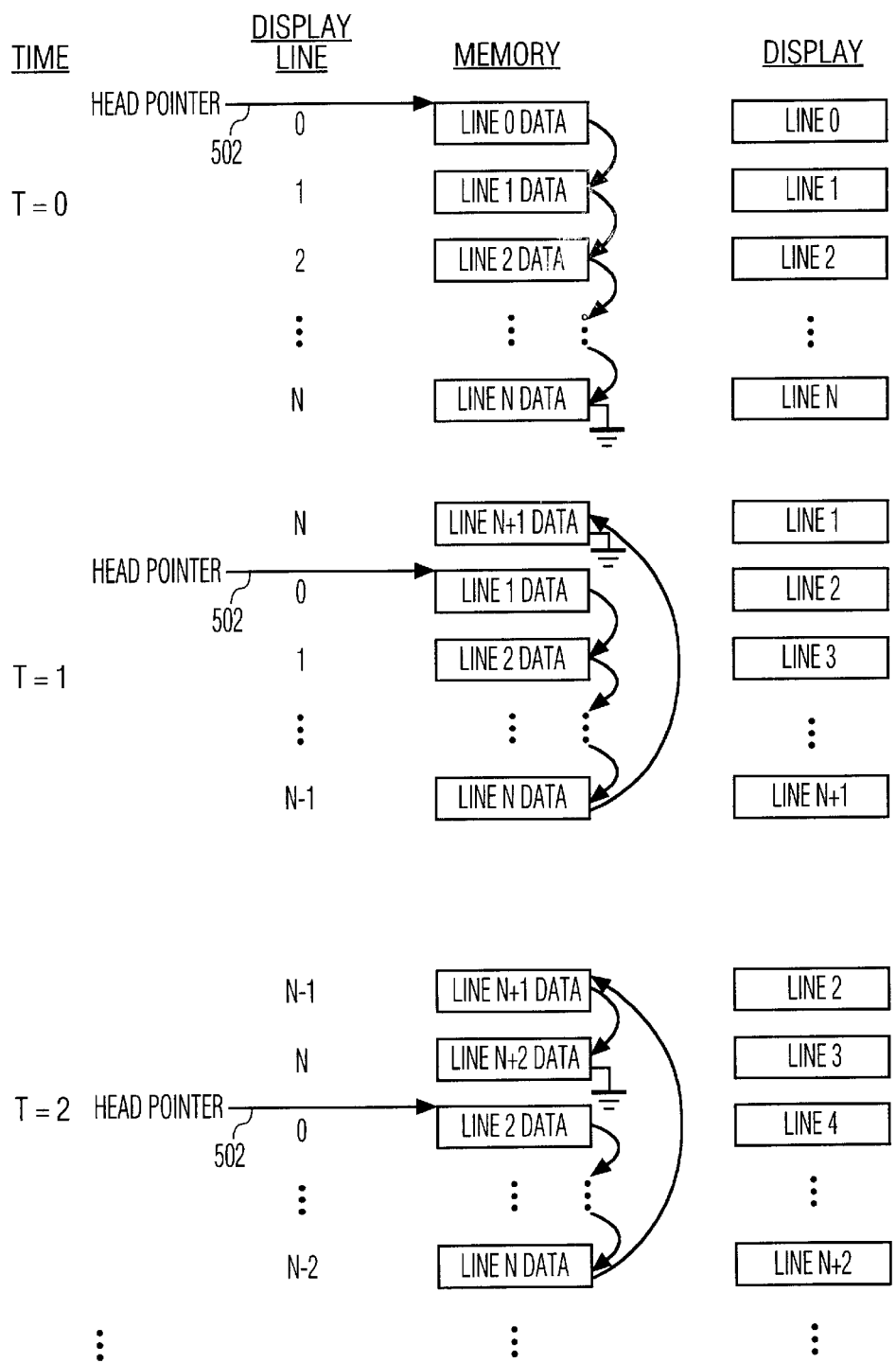
FIG. 5 shows memory contents during operation of the second exemplary embodiment of the present invention.

The second exemplary embodiment of the present invention is described with reference to FIGS. 4 and 5. FIG. 4 is a flow chart 400 which is useful for describing the operation of an OSD processor 170 according to this second exemplary embodiment of the invention. FIG. 5 shows how the OSD processor 170 stores reformatted OSD data in memory 130.

In step 402, the OSD processor 170 generates a linked list of a plurality of memory 130 regions. In step 404, a single raster line of OSD data is stored by the OSD processor 170 in each of the plurality of memory regions. A head pointer contains the address of, or points to, the first memory region in the linked list. In step 406, a head pointer 502 (FIG. 5) is initialized to point to the address of the first memory region in the linked list to identify the start of the linked list. In step 408, starting at the memory region pointed to by the head pointer 502, the contents of the memory regions in the linked list are transferred to the display section 150 for display.

The contents of the linked list and the OSD after step 408 are illustrated in FIG. 5 at T=0. The linked list of FIG. 5 includes N+1 memory regions. The first memory region, which is pointed to by the head pointer 502, contains Line 0 Data. The last memory region contains Line N Data. The arrows linking each memory region illustrate that each memory region stores the address, and is thereby linked to, the next successive memory regions in the linked list. The last memory region stores a code to indicate that the end of the linked list has been reached. At T=0, the linked list stores Line 0 Data through Line N Data.

Assuming for this example that the OSD is to be scrolled up, in step 410, operation is directed to step 412. In step 412, the head pointer is set to point to the address of the next memory region in the linked list of memory regions. As shown in FIG. 5 at T=1, the head pointer now points to Line 1 Data rather than Line 0 Data. Shifting the head pointer forward one memory region has shortened the linked list by one memory region. A memory region is added to the end of the linked list in step 414. The added memory region stores the next line of OSD data in the sequence of received lines of OSD data in step 416. This added memory region stores Line N+1 Data as shown at Time T=1 in FIG. 5. Returning to step 408, the display section 150 displays the OSD data stored in the linked list resulting in the display of Line 1 Data through Line N+1 Data.

Assuming that the OSD is again determined to be scrolled up in step 410, returning to steps 412, 414, and 416 will result in the linked list containing Line 2 Data through Line N+2 Data as shown at T=2 in FIG. 5. In step 408, the display section 150 displays the OSD data stored in the linked list resulting in the display of Line 2 Data through Line N+2 Data.

The second exemplary embodiment is described above for the case where an OSD is scrolled up. An OSD may be scrolled down by following steps 422, 424, and 426 in FIG. 4 which are analogous to steps 412, 414, and 416. When scrolling down, rather than adjusting the head pointer to the next memory region in the linked list, the head pointer is set to point to an added memory region and the next to last memory region in the list becomes the last memory region in the linked list.

The second exemplary embodiment is described above as using a linked list of memory regions wherein each memory region is used to store a single raster line of OSD Data. As known to those skilled in the art, the teachings of this invention may be applied to applications where more than one raster line are stored in each linked memory region or to applications where a line of characters is stored in each linked memory region rather than a raster line.

Figure 6:
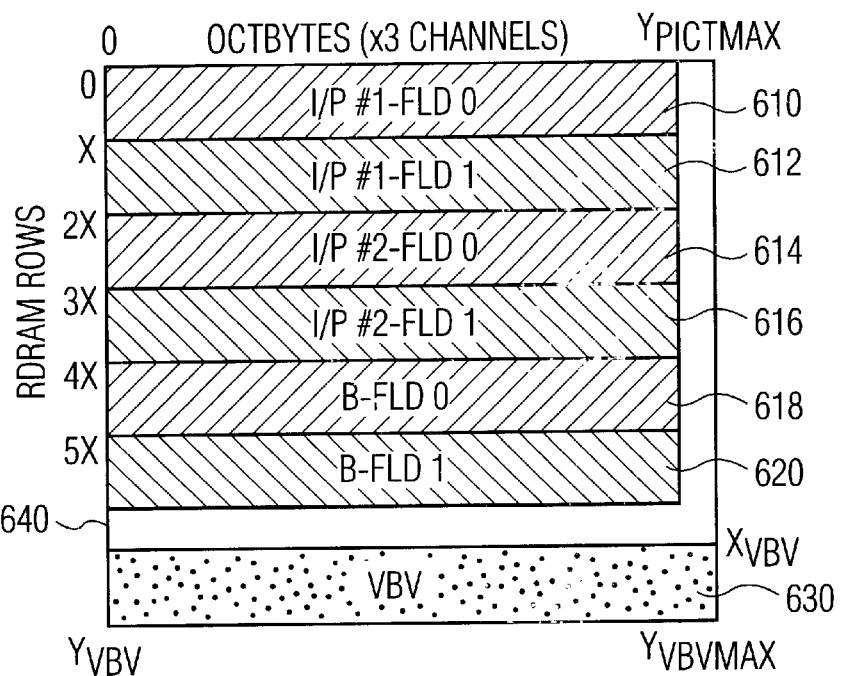
FIGS. 6–7 are memory map diagrams which show how memory is used to store on screen display data for exemplary embodiments of the present invention.
Figure 7:
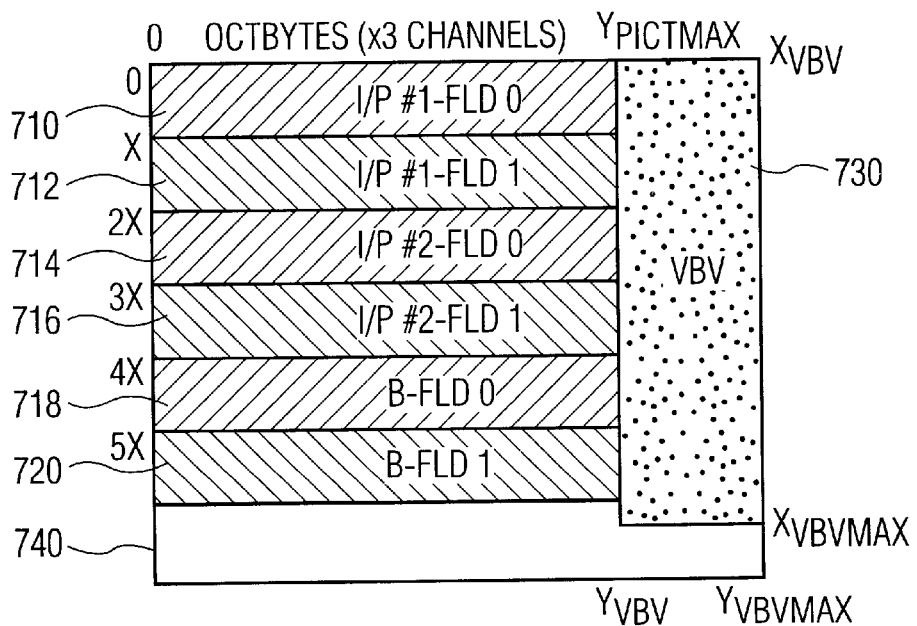

FIGS. 6–7 are memory map diagrams which show how memory is used to store on screen display data for exemplary embodiments of the present invention. Memory mapping as shown in FIGS. 6–7 is taught by Richard Sita et. al. in PCT Application No. PCT/US98/04755, filed on Mar. 11, 1998, entitled MPEG DECODER PROVIDING MULTIPLE STANDARD OUTPUT SIGNALS, which is hereby incorporated by reference.

FIG. 6 shows a memory map for an exemplary embodiment of the present invention where the MPEG-2 decoder operates in a full spec mode where the memory 130 capacity is 96 Mbits. In FIG. 6, the incoming bitstream is designated as reference numeral 630 and the image data fields are designated by reference numerals 610, 612, 614, 616, 618, and 620. In an exemplary embodiment of the present invention, the reformatted OSD data may be stored in memory region 640. As shown in FIG. 6, the memory 130 is nearly fully used in the full spec mode. The second embodiment of the invention may be advantageously used in this memory configuration as it may use small memory areas which are not contiguous.

FIG. 7 shows a memory map for an exemplary embodiment of the present invention where the MPEG-2 decoder operates in a down conversion mode where the memory 130 capacity is 48 Mbits. In FIG. 7, the incoming bitstream is designated as reference numeral 730 and the image data fields are designated by reference numerals 710, 712, 714,

716, 718, and 720. In an exemplary embodiment of the present invention, the reformatted OSD data may be stored in memory region 740. As a greater amount of memory is available for use in the memory configuration shown in FIG. 7, either the first embodiment of the invention or the second embodiment of the invention may be used.

While exemplary embodiments of the invention have been shown and described herein, it will be understood that such embodiments are provided by way of example only. Numerous variations, changes, and substitutions will occur to those skilled in the art without departing from the spirit of the invention. Accordingly, it is intended that the appended claims cover all such variations as fall within the scope of the invention.

What is claimed:

1. An apparatus for scrolling an on screen display using on screen display data, wherein the on screen display data is included in an encoded video signal representing a video image, the apparatus comprising:

means for receiving the encoded video signal and decoding the on screen display data as a sequence of lines of on screen display data;

memory means including a first buffer and a second buffer;

on screen display processing means for storing a group of lines of the sequence of lines of the on screen display data in the first buffer and alternately storing successive groups of lines of the sequence of lines of the on screen display data in the second buffer and the first buffer, wherein each successive group of lines includes a plurality of lines from the previous group of lines and is shifted by at least one line in the sequence of lines of on screen display data with respect to the previous group of lines;

display means for alternately displaying the on screen display data from the first buffer and the second buffer synchronized with the storage of the successive groups of lines of the sequence of lines of the on screen display data in the second and first buffers, respectively, whereby the most recently stored group of lines is displayed.

2. The apparatus for scrolling an on screen display according to claim 1 wherein the encoded video signal is an MPEG-2 bitstream and the on screen display data is closed caption information which is encoded within a user data field of one of a sequence header, a group of pictures header, and a picture header.

3. The apparatus for scrolling an on screen display according to claim 1 wherein the on screen display is scrolled up by shifting each successive group of lines forward along the sequence of lines of the on screen display data.

4. The apparatus for scrolling an on screen display according to claim 1 wherein the on screen display is scrolled down by shifting each successive group of lines backward along the sequence of lines of the on screen display data.

5. An apparatus for scrolling an on screen display using on screen display data, wherein the on screen display data is included in an encoded video signal representing a video image, the apparatus comprising:

means for receiving the encoded video signal and decoding the on screen display data as a sequence of lines of on screen display data;

memory means including a plurality of storage regions;

on screen display processing means for forming a linked list of a group of storage regions, the linked list of storage regions having a first region and last region, storing a group of lines of the sequence of lines of the on screen display data in the linked list of storage regions, storing on screen display data corresponding to at least one successive line of the on screen display data along the sequence of lines of the on screen display data in one of the plurality of storage regions not currently in the linked list identified as the new link, and shifting the first region and the last region of the linked list to add a region and delete a region from the group of storage regions in the linked list so the added region is the new link; and display means for displaying the group of lines of on screen data stored in the linked list.

6. An apparatus for scrolling an on screen display according to claim 5 wherein the region deleted from the group of storage regions and the region added to the group of storage regions are the same memory region.

7. An apparatus for scrolling an on screen display according to claim 5 wherein each of the sequence of lines of on screen display data is stored in a respectively different one of the plurality of storage regions in the linked list.

8. An apparatus for scrolling an on screen display according to claim 5 wherein each line of on screen display data corresponds to a raster line.

9. An apparatus for scrolling an on screen display according to claim 5 wherein each line of on screen display data corresponds to a character line.

10. The apparatus for scrolling an on screen display according to claim 5 wherein the encoded video signal is an MPEG-2 bitstream and the on screen display data is closed caption information, encoded within a user data field of one of a sequence header, a group of pictures header, and a picture header.

11. The apparatus for scrolling an on screen display according to claim 5 wherein the on screen display is scrolled up and the on screen display data stored in the new link includes a next successive line along the sequence of lines of on screen display data.

12. The apparatus for scrolling an on screen display according to claim 5 wherein the on screen display is scrolled down and the on screen display data stored in the new link includes a previous successive line along the sequence of lines of on screen display data.

13. An apparatus for scrolling up an on screen display using on screen display data, wherein the on screen display data is included in an encoded video signal representing a video image, the apparatus comprising:

means for receiving the encoded video signal and decoding the on screen display data as a sequence of lines of on screen display data;

memory means including a plurality of storage regions;

on screen display processing means for forming a linked list of a group of the plurality of storage regions, the linked list of storage regions having a first region and last region, storing a group of lines of the sequence of lines of the on screen display data in the linked list of storage regions where each storage region stores one respective line of on screen display data, storing on screen display data corresponding to a next line of the on screen display data along the sequence of lines of the on screen display data in the first region of the linked list, shifting a pointer to the first region in the linked list to point to the next region in the linked list and redefining the last region in the linked list to be the region storing the next line of the on screen display data; and display means for displaying the group of lines of on screen data stored in the linked list.

14. A method for scrolling an on screen display using on screen display data, wherein the on screen display data is included in an encoded video signal representing a video image, the method comprising the steps of:

(a) receiving the encoded video signal and decoding the on screen display data as a sequence of lines of on screen display data;

(b) storing a group of lines of the sequence of lines of the on screen display data in a first buffer of a memory (c) alternately storing successive groups of lines of the sequence of lines of the on screen display data in a second buffer of the memory and in the first buffer, wherein each successive group of lines includes a plurality of lines from the previous group of lines and is shifted by at least one line in the sequence of lines of on screen display data with respect to the previous group of lines; and (d) alternately displaying the on screen display data from the first buffer and the second buffer synchronized with the storage of the successive groups of lines of the sequence of lines of the on screen display data in the second and first buffers, respectively, whereby the most recently stored group of lines is displayed.

15. A method for scrolling an on screen display according to claim 14 wherein the encoded video signal is an MPEG-2 bitstream and the on screen display data is closed caption information which is encoded within a user data field of one of a sequence header, a group of pictures header, and a picture header.

16. A method for scrolling an on screen display according to claim 14 wherein the on screen display is scrolled up by shifting each successive group of lines forward along the sequence of lines of the on screen display data.

17. The apparatus for scrolling an on screen display according to claim 14 wherein the on screen display is scrolled down by shifting each successive group of lines backward along the sequence of lines of the on screen display data.

18. A method for scrolling an on screen display using on screen display data, wherein the on screen display data is included in an encoded video signal representing a video image, the method comprising the steps of:

(a) receiving the encoded video signal and decoding the on screen display data as a sequence of lines of on screen display data;

(b) forming a linked list of a group of storage regions in a memory including a plurality of storage regions, the linked list of storage regions having a first region and last region;

(c) storing a group of lines of the sequence of lines of the on screen display data in the linked list of storage regions;

(d) storing on screen display data corresponding to at least one successive line of the on screen display data along the sequence of lines of the on screen display data in one of the plurality of storage regions not currently in the linked list identified as the new link;

(e) shifting the first region and the last region of the linked list to add a region and delete a region from the group of storage regions in the linked list so the added region is the new link; and (f) displaying the group of lines of on screen data stored in the linked list.

19. A method for scrolling an on screen display according to claim 18 wherein the region deleted from the group of storage regions and the region added to the group of storage regions are the same memory region.

20. A method for scrolling an on screen display according to claim 18 wherein each of the sequence of lines of on screen display data is stored in a respectively different one of the plurality of storage regions in the linked list.

21. A method for scrolling an on screen display according to claim 18 wherein each line of on screen display data corresponds to a raster line.

22. A method for scrolling an on screen display according to claim 18 wherein each line of on screen display data corresponds to a character line.

23. A method for scrolling an on screen display according to claim 18 wherein the encoded video signal is an MPEG-2 bitstream and the on screen display data is closed caption information, encoded within a user data field of one of a sequence header, a group of pictures header, and a picture header.

24. A method for scrolling an on screen display according to claim 18 wherein the on screen display is scrolled up and the on screen display data stored in the new link includes a next successive line along the sequence of lines of on screen display data.

25. A method for scrolling an on screen display according to claim 18 wherein the on screen display is scrolled down and the on screen display data stored in the new link includes a previous successive line along the sequence of lines of on screen display data.

26. A method for scrolling up an on screen display using on screen display data, wherein the on screen display data is included in an encoded video signal representing a video image, the method comprising the steps of:

(a) receiving the encoded video signal and decoding the on screen display data as a sequence of lines of on screen display data;

(b) forming a linked list, in a memory including a plurality of storage regions, of a group of the plurality of storage regions, the linked list of storage regions having a first region and last region;

(c) storing a group of lines of the sequence of lines of the on screen display data in the linked list of storage regions where each storage region stores one respective line of on screen display data;

(d) storing on screen display data corresponding to a next line of the on screen display data along the sequence of lines of the on screen display data in the first region of the linked list;

(e) shifting a pointer to the first region in the linked list to point to the next region in the linked list and redefining the last region in the linked list to be the region storing the next line of the on screen display data; and (f) displaying the group of lines of on screen data stored in the linked list.

27. A method for displaying video information including the steps of:

(a) receiving the video information as a sequence of lines of video information;

(b) forming a linked list, in a memory including a plurality of storage regions, of a group of the plurality of storage regions, the linked list of storage regions having a first region, a next region following the first region, and a last region;

(c) storing a group of lines of the sequence of lines of video information in the linked list of storage regions where each storage region stores one respective line of on screen display data;

(d) storing a next line of the video information along the sequence of lines of video information screen display data in the first region of the linked list;

(e) redefining the first region in the linked list to be the next region in the linked list and redefining the last region in the linked list to be the region storing the next line of the video information; and (f) displaying the group of lines of video information stored in the linked list.

\* \* \* \* \*